United States Patent
Itazu et al.

(10) Patent No.: US 6,405,354 B1
(45) Date of Patent: Jun. 11, 2002

(54) METHOD AND APPARATUS TO OPTIMIZE POWER WIRING LAYOUT AND GENERATE WIRING LAYOUT DATA FOR A SEMICONDUCTOR INTEGRATED CIRCUIT

(75) Inventors: Kazushige Itazu; Takayuki Matsuzawa; Takanori Nawa, all of Kasugai (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/215,239

(22) Filed: Dec. 18, 1998

(30) Foreign Application Priority Data

Jul. 28, 1998 (JP) .......................................... 10-213156

(51) Int. Cl.[7] ............................. G06F 17/50; G06F 9/45
(52) U.S. Cl. .................................. 716/8; 716/2; 716/11
(58) Field of Search ............................................. 716/8

(56) References Cited

U.S. PATENT DOCUMENTS

| | | | | |
|---|---|---|---|---|
| 5,075,753 A | * | 12/1991 | Kozono | 357/45 |
| 5,537,328 A | * | 7/1996 | Ito | 364/489 |
| 5,598,348 A | * | 1/1997 | Rusu et al. | 364/491 |
| 5,824,570 A | * | 10/1998 | Aoki et al. | 438/128 |
| 5,878,053 A | * | 3/1999 | Koh et al. | 371/22.1 |
| 5,917,729 A | * | 6/1999 | Naganuma et al. | 364/491 |
| 6,247,162 B1 | * | 6/2001 | Fujine et al. | 716/2 |

* cited by examiner

*Primary Examiner*—Matthew Smith
*Assistant Examiner*—A. M. Thompson
(74) *Attorney, Agent, or Firm*—Staas & Halsey LLP

(57) ABSTRACT

A program for generating layout data for a semiconductor integrated circuit analyzes a power network of individual modules in order to determine when an iterative layout process is complete. First, the individual modules are laid out and power supply wirings to the modules are laid out. Next, using cell size information about the cells within each of the modules, the cells of each module are temporarily arranged within the modules. Then, the power wirings and power supply terminals for each module are specified. A power network of each module is then sampled based on the cells, power wirings and power supply terminals of each module. Using the sample data, it is determined whether the modules and the power supply wirings to the modules need to be laid out again. The program may be executed on a CAD system.

48 Claims, 12 Drawing Sheets

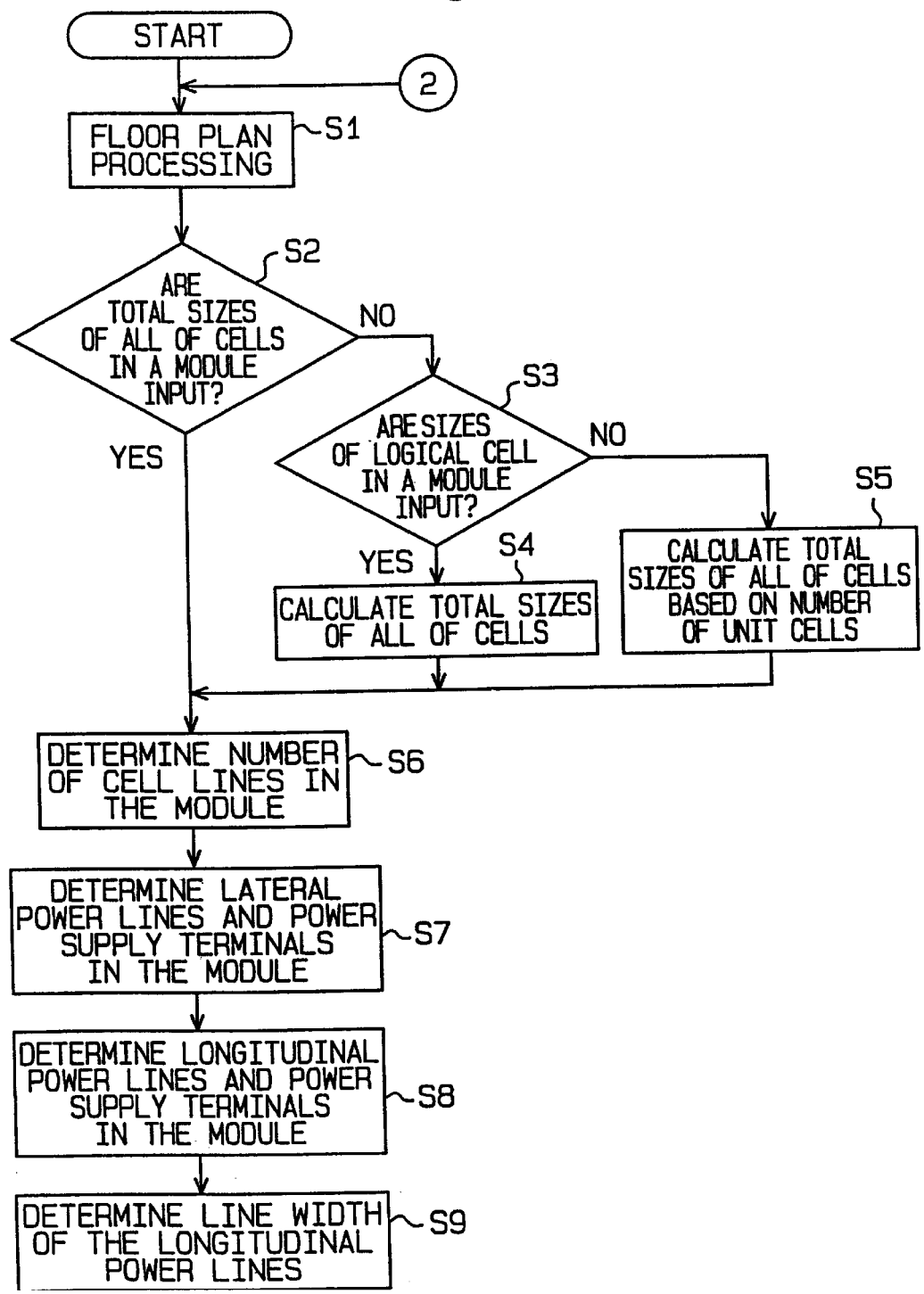

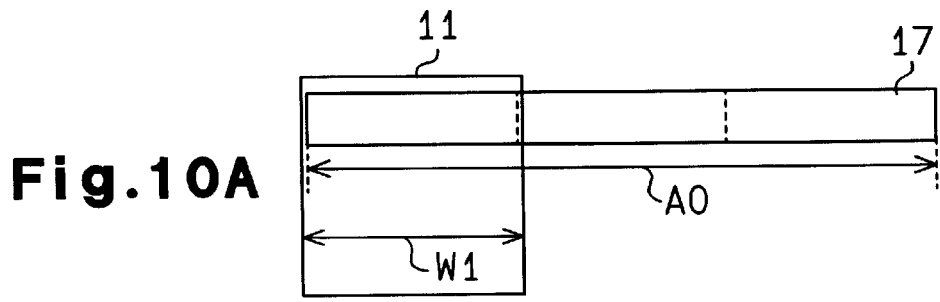
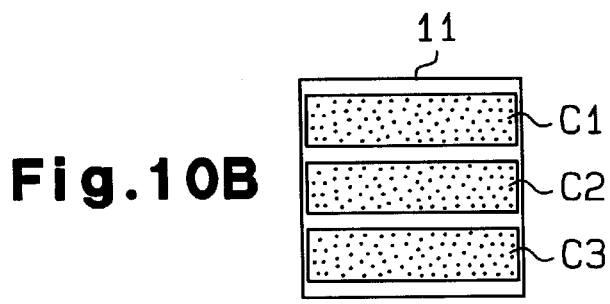
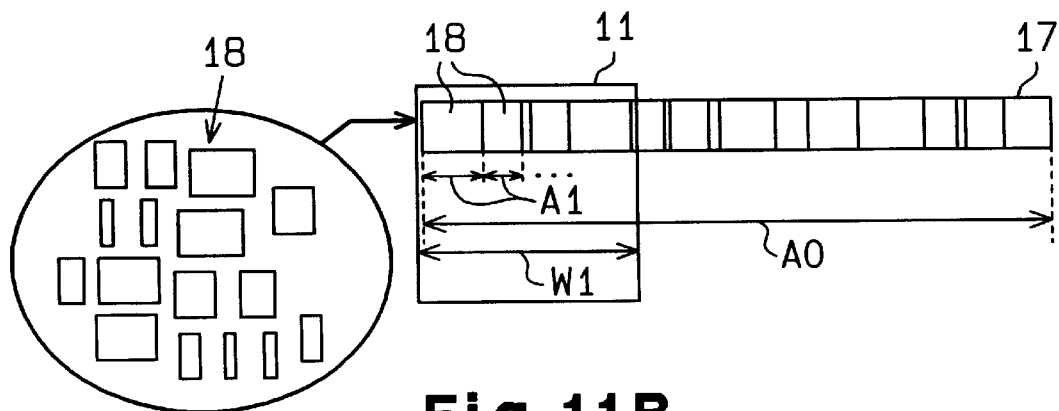
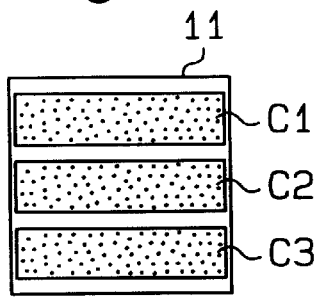

INTRA-MODULE UNIT CELLS

METHOD AND APPARATUS TO OPTIMIZE POWER WIRING LAYOUT AND GENERATE WIRING LAYOUT DATA FOR A SEMICONDUCTOR INTEGRATED CIRCUIT

BACKGROUND OF THE INVENTION

The present invention generally relates to a method and apparatus to optimize intra-module layout in a layout data apparatus, and more particularly, to reduce the time required to generate wiring layout data for a semiconductor integrated circuit (IC) in which inter-module power wirings are optimized.

FIG. 1 is a layout diagram of a single chip semiconductor device 50 in an initial design stage. First, a layout data generating apparatus executes floor plan processing for the semiconductor device 50. Specifically, a plurality of (three in FIG. 1) modules 51 to 53 are laid out on the semiconductor device 50. Subsequently, wirings (inter-module power wirings) 50b for supplying power from external power supply terminals 50a of the chip to each of the modules 51 to 53 are laid out.

The layout data generating apparatus then executes the layout of each of the modules 51 to 53. In other words, various types of cells 51a, power supply wiring (intra-module power wirings) 51b to each of the cells 51a, and module power supply terminals Sic are laid out in the module 51.

After completion of the intra-module layout, the layout data generating apparatus optimizes the layout in accordance with the following steps 1 to 3.

1. As shown in FIG. 2, a power network is sampled based on the various types of the cells 51a and the module power wirings 51b laid out in the module 51. The power network comprises a plurality of equivalent resistances R and current sources CS. Specifically, the power wirings 51b are replaced by a plurality of equivalent resistances R having resistance values determined according to a unit resistance value, wiring length, and wiring width. Because each of the cells 51a and transistors dissipates current, the cells 51a are replaced by the current sources CS with current values determined based on the current consumption. Power networks of the modules 52, 53 are also sampled the same as the module 51.

2. After the power network in each of the modules 51 to 53 has been sampled, the inter-module power wirings 50b are replaced by a plurality of the equivalent resistances R. Thus, the power network of the entire semiconductor device 50 is sampled. Subsequently, the sampled power network is analyzed. Through the analysis of the power network, the current density, voltage drop, and voltage value of the inter-module power wirings 50b are calculated using a well known matrix operation.

3. Based on the analysis results, the excess and deficiency of the inter-module power wirings 50b are determined. The wiring width and position of the inter-module power wirings 50b are corrected in accordance with the determined excess and deficiency of the wirings. That is, the entire semiconductor device 50 is optimized. Specifically, it is determined that the power wirings 50b may become discontinuous or disconnected due to electromigration in the wiring where the current density is higher than a standard. In this case, the power wiring 50b is made thicker or the number of power wirings is increased. Further, it is determined where the area of the power wirings 50b is redundant in the wiring part where the current density is lower than the standard. In this case, a portion of the power wirings 50b is made thinner or eliminated. If the voltage values of the module power supply terminals 51c are lower than standard values, it is determined that the transistors in the modules 51 to 53 may not operate. In this case, the wiring portion having a large voltage drop in the power wirings 50b from the power supply terminals 51c is made thicker or reinforcing wirings are added.

The position and shape of each of the modules 51 to 53 may also need to be changed due to changes of the wiring width and position of the inter-module power wiring 50b. In such a case, the above-mentioned floor plan processing needs to be re-executed. However, the layout in each of the modules 51 to 53 has already been executed based on the current floor plan. Accordingly, by re-executing the floor plan processing, the internal portion of each module needs to be laid out again.

A specific example is shown with a semiconductor device 60 of FIG. 3. A module 61 having relatively high power consumption is laid out at the center of the semiconductor 60, and modules 62 to 65 are laid out around its periphery. Inter-module power wirings 66 are arranged among the respective modules 61 to 65. As shown in FIG. 4A, the sizes of the modules 62 and 64 are reduced as shown by dashed lines, and the spaces between the modules 62 and 64 and their adjacent modules are made wider so that the width of the power wiring 66 facing the center module 61 is increased. As shown in FIG. 4B, intra-module power wirings 62a and 64a can be added to the modules 62 and 64. The amount of current applied to the center module 61 is increased by the added intra-module power wirings 62a and 64a. Accordingly, in such a case, the internal portion of the modules 62 and 64 needs to be laid out again.

After the internal portion of each of the modules 62 and 64 has been laid out again, the above-mentioned optimization is carried out again. Repeating such re-layout and optimization in each module prolongs the layout data generation time of the semiconductor device 60 and increases the design cost of the semiconductor device 60.

It is an object of the present invention to provide a method and device for reducing the layout data generation time.

SUMMARY OF THE INVENTION

Briefly stated, the present invention provides a method for generating layout data for a semiconductor integrated circuit having a plurality of modules. Each of the modules has a plurality of cells. First, each of the modules are laid out, and power supply wirings to each of the modules are laid out. Next, information about the cell size of the cells of each module is acquired. Then, the cells are temporarily arranged in each module based on the information about the cell size, and out power wirings and power supply terminals for each module are laid out based on the temporary arrangement of the cells of the modules. A power network is sampled in a unit of each module based on the cells in the module, the power wirings, and the power supply terminals. The sampled power network for each module is analyzed, and it is determined whether each module and the power supply wirings need to be laid out again based on the analysis result.

The present invention provides a recording medium having recorded thereon computer readable program code for generating layout data for a semiconductor integrated circuit. The circuit has a plurality of modules having a plurality of cells. The program causes the computer to execute the above method.

The present invention provides a method for generating layout data for a semiconductor integrated circuit having a plurality of modules. Each module includes a plurality of cells. First, each module is laid out, and power supply wirings to each laid out module are laid out. Next, information about the cell size of the cells of each of the modules is acquired. Then, a plurality of cell lines regions in each module are defined based on the cell size information, and the cells are temporarily arranged in each cell line region. Then, power wirings for each cell line in the module, are laid out, and power supply terminals connected to the power wirings are laid out. A power network in a unit of each module is then sampled based on the cells in the module, the power wirings, and the power supply terminals. The sampled power network is analyzed for each module, and it is determined whether each module and each power supply wiring need to be laid out again based on the analysis result.

The present invention provides a recording medium having recorded thereon computer readable program code for generating layout data for a semiconductor integrated circuit. The circuit has a plurality of modules having a plurality of cells. The program causes the computer to execute the above method.

The present invention provides an apparatus for generating layout data for a semiconductor integrated circuit having a plurality of modules. Each of the modules includes cells. The apparatus includes a memory for storing information about the cell size of the cells of each module. A processor is connected to the memory and executes layout processing. The processor operates to: lay out each module; lay out power supply wirings to the plurality of modules; temporarily arrange the cells in each module based on the cell size information; lay out power wirings and power supply terminals in the module based on the temporary arrangement of the cell; sample a power network in a unit of each module based on the cells in the module, the power wirings, and the power supply terminals; analyze the sampled power network for each module; and determine whether each module and the power supply wirings need to be laid out again based on the analysis result.

The present invention provides an apparatus for generating layout data for a semiconductor integrated circuit having a plurality of modules. Each module includes a plurality of cells. The apparatus includes a memory for storing information about the cell size of the cells of each module. A processor is connected to the memory and executes layout processing. The processor operates to: lay out each module; lay out power supply wirings to the plurality of modules; define a plurality of cell line regions in each module based on the cell size information; temporarily arrange the cells in each cell line region; lay out power wirings for each module including first power wirings in parallel with each cell line in the module and laying out power supply terminals connected to the power wirings; sample a power network in a unit of each module based on the cells in the module, the power wirings, and the power supply terminals; analyze the sampled power network for each module; and determine whether each module and corresponding power supply wiring needs to be laid out again based on the analysis result.

Other aspects and advantages of the invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which:

FIG. 5 is a flowchart of a layout data generation processing system according to one embodiment of the present invention;

FIG. 10A is a diagram illustrating relationships between the total size of all of cells of the device of FIG. 8 and the width of a module and FIG. 10B is a layout diagram of a module in which cell lines are arranged;

FIG. 11A is a layout diagram illustrating relationships between the total size of all of logical cells of the device of FIG. 8 and the width of a module and FIG. 11B is a layout diagram of the module in which the cell lines are arranged;

DETAILED DESCRIPTION OF THE PREFERRED EMBODIMENTS

Figure 7:
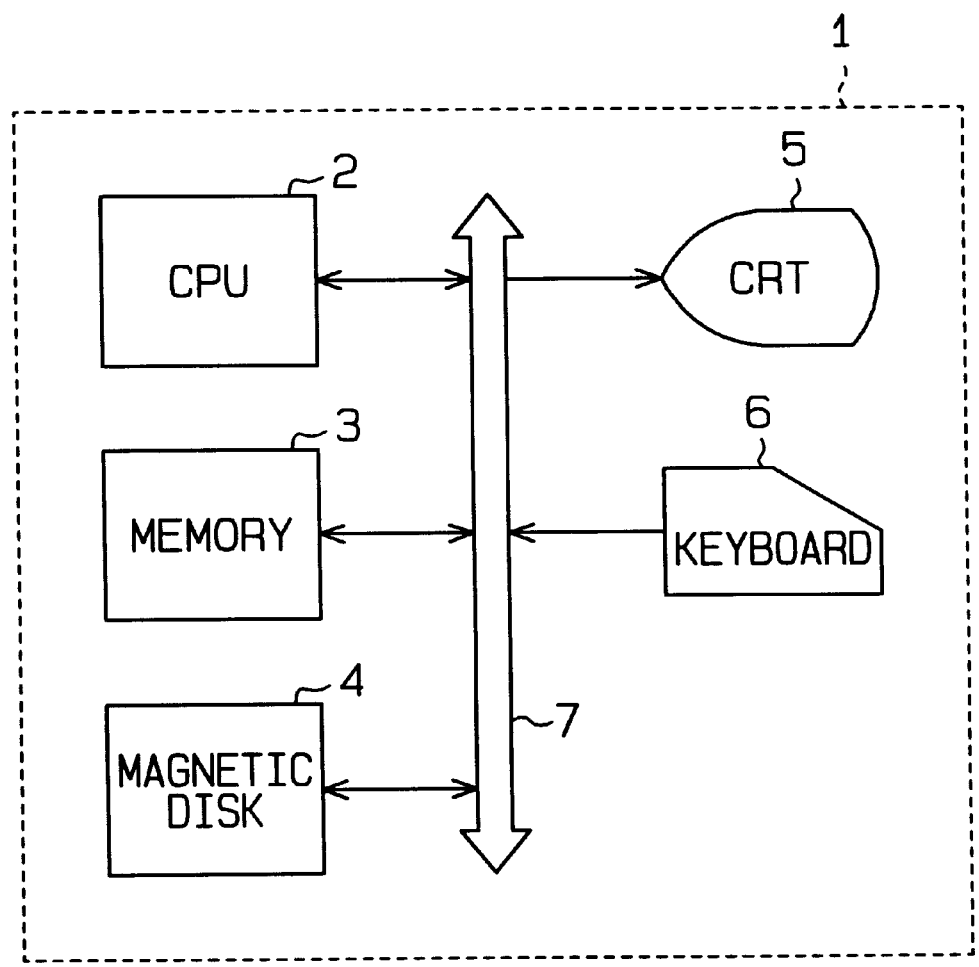
FIG. 7 is a schematic block diagram of a layout data generating apparatus according to one embodiment of the present invention.

FIG. 7 is a schematic block diagram of a layout data generating apparatus 1 according to one embodiment of the present invention. The layout data generating apparatus 1 is preferably a CAD (computer aided design) device and is equipped with a central processing unit (CPU) 2, a memory 3, a storage unit such as a magnetic disk 4, a display device 5 such as a CRT, and a keyboard (including a mouse) which communicate with each other via a system bus 7. The CPU 2 operates in accordance with a predetermined program stored in the memory 3, stores the various data required for executing the program and temporarily stores the processing data of the CPU 2. The keyboard 6 is used to enter the data required for executing the program or to input various user instructions, such as to output a processing result to the display device 5 and/or a printer (not illustrated). The CPU 2 lays out a semiconductor device in accordance with the data entered from the keyboard 6 and records the layout data on the magnetic disk 4.

Figure 1:
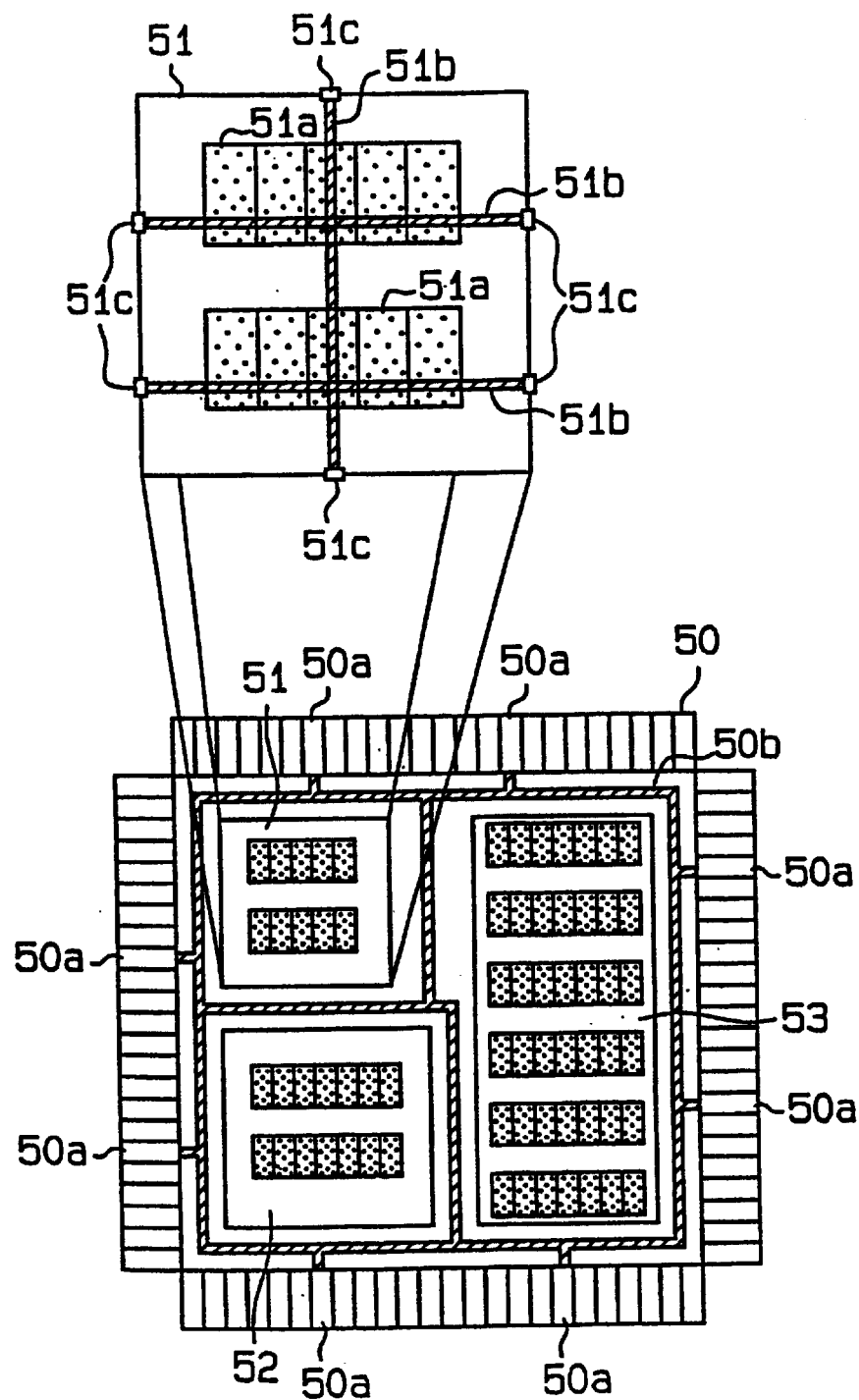
FIG. 1 is a layout diagram of a semiconductor device generated by a conventional layout data generation processing system.
Figure 2:
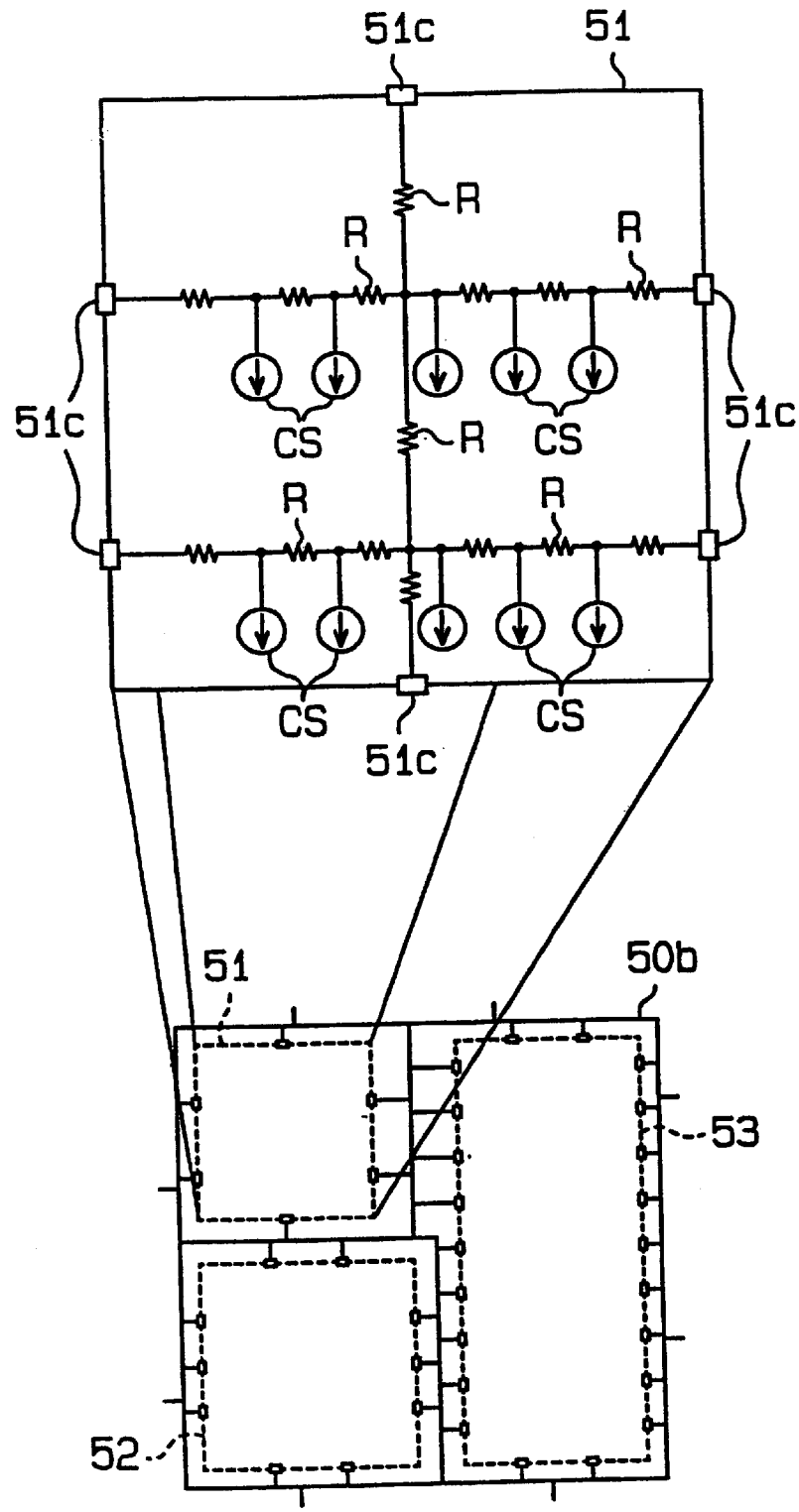
FIG. 2 is a schematic diagram of an intra-module power network-in a semiconductor device.
Figure 3:
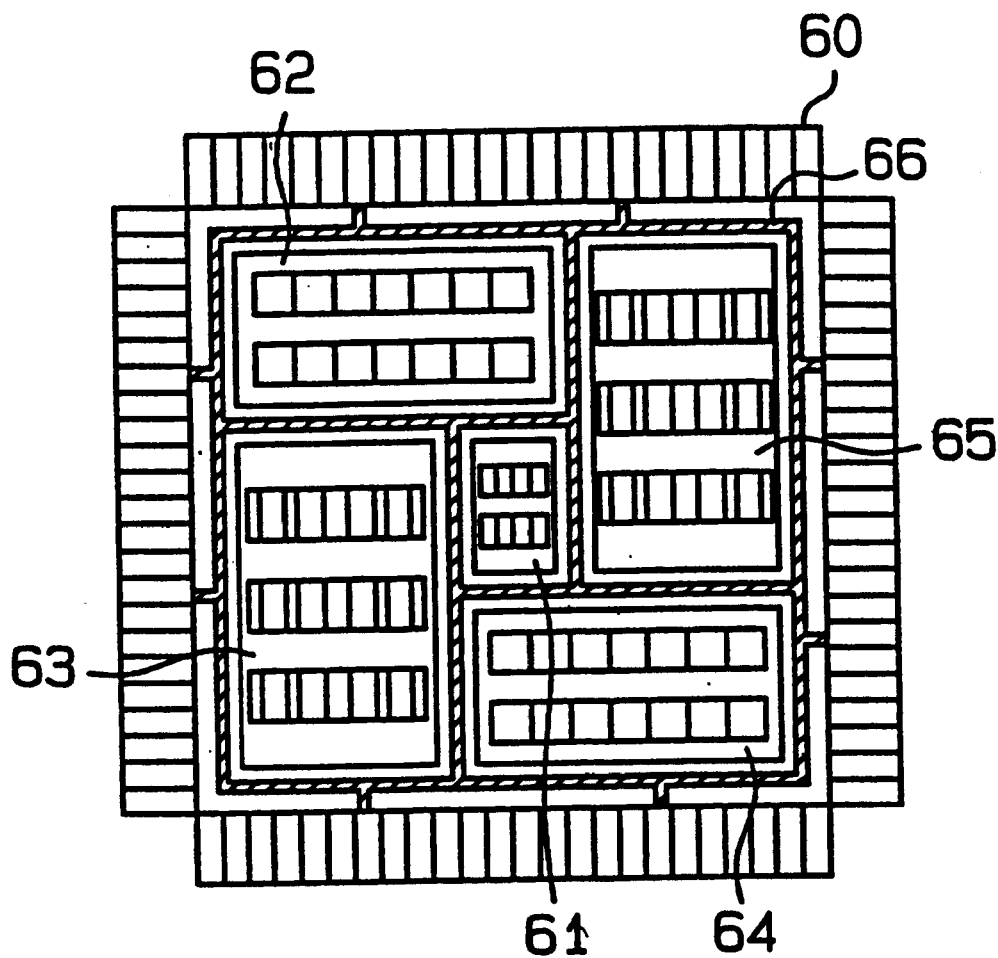
FIG. 3 is a layout diagram of a semiconductor device.
Figure 4A:
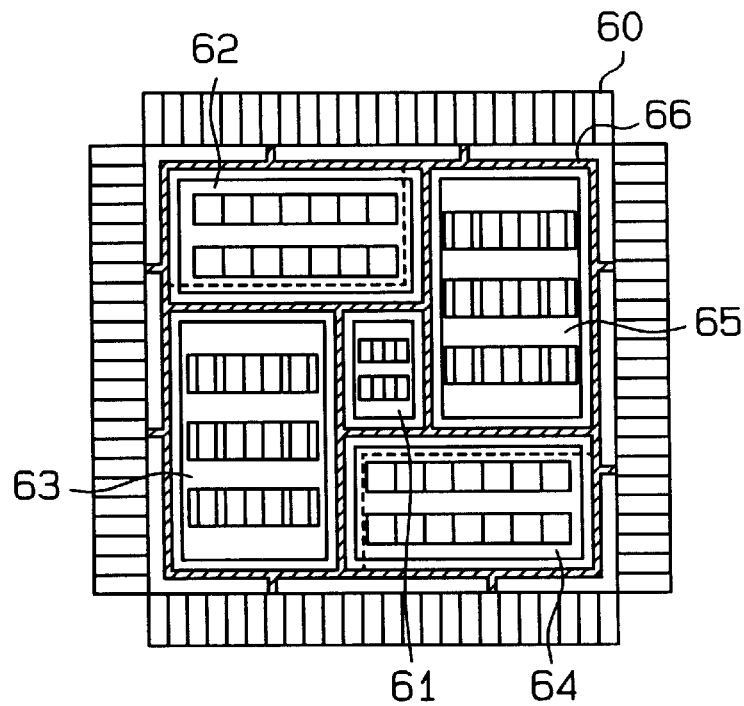
FIG. 4A is a diagram illustrating changes in module size of the device of FIG. 3 for increasing a width of an inter-module power wiring.
Figure 4B:
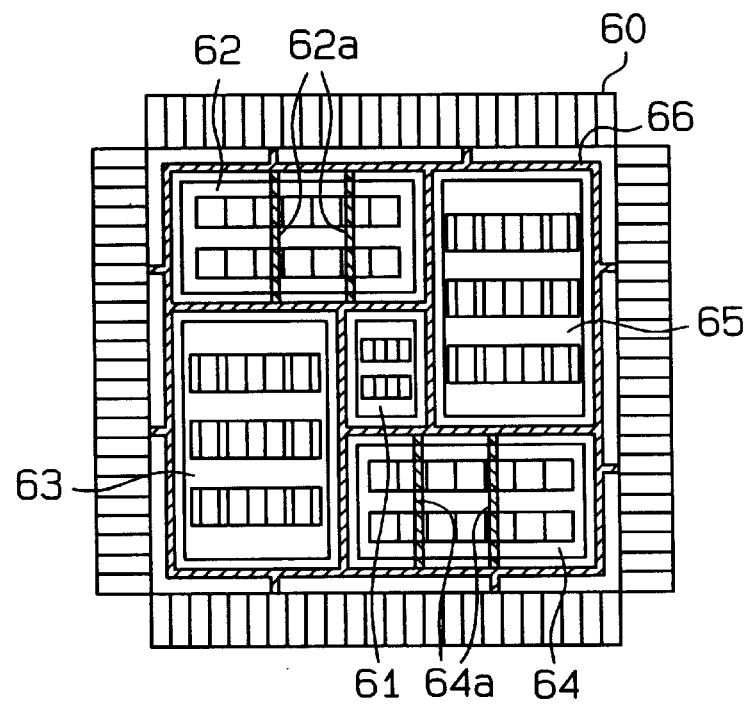
FIG. 4B is a diagram illustrating the addition of the inter-module power wiring.
Figure 6:
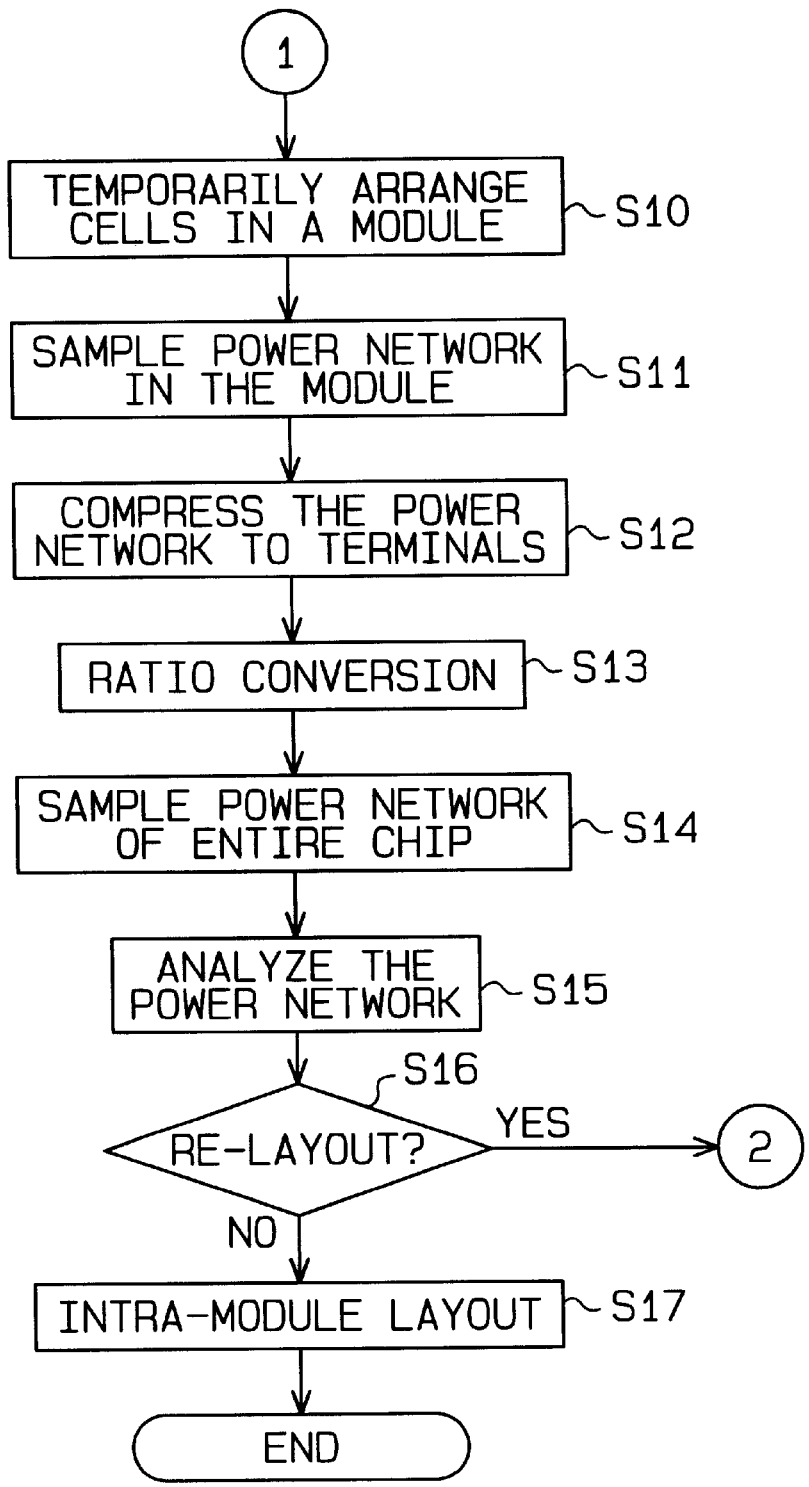
FIG. 6 is a flowchart of the layout data generation processing system continued from FIG. 5.

The CPU 2 executes steps S1 to S17 of the layout data generation processing shown in FIGS. 5 and 6. The layout data generation processing is described with reference to FIGS. 5–6 and 8–17.

Figure 8:
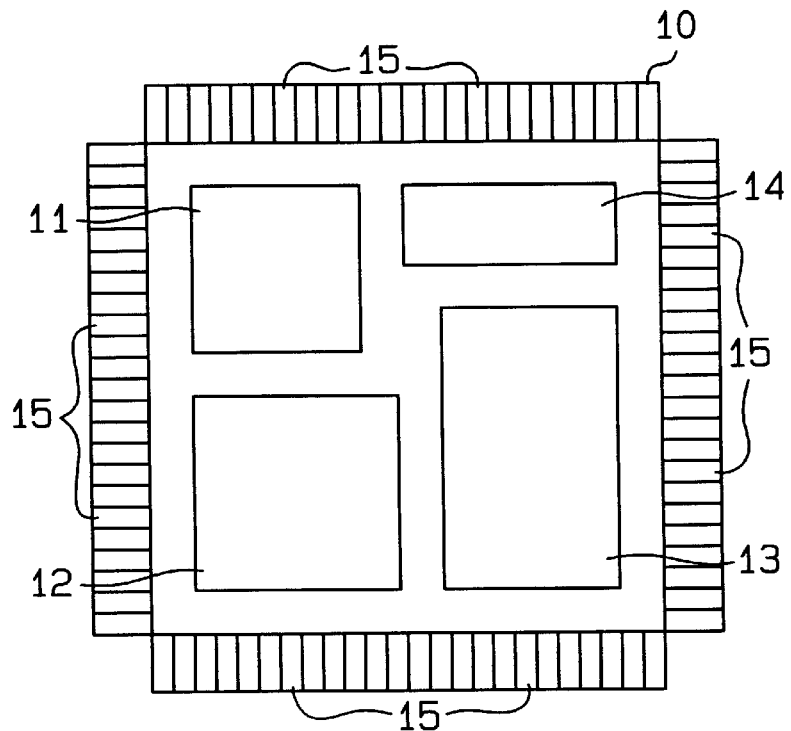
FIG. 8 is a layout diagram of a semiconductor device in which modules are arranged.
Figure 9:
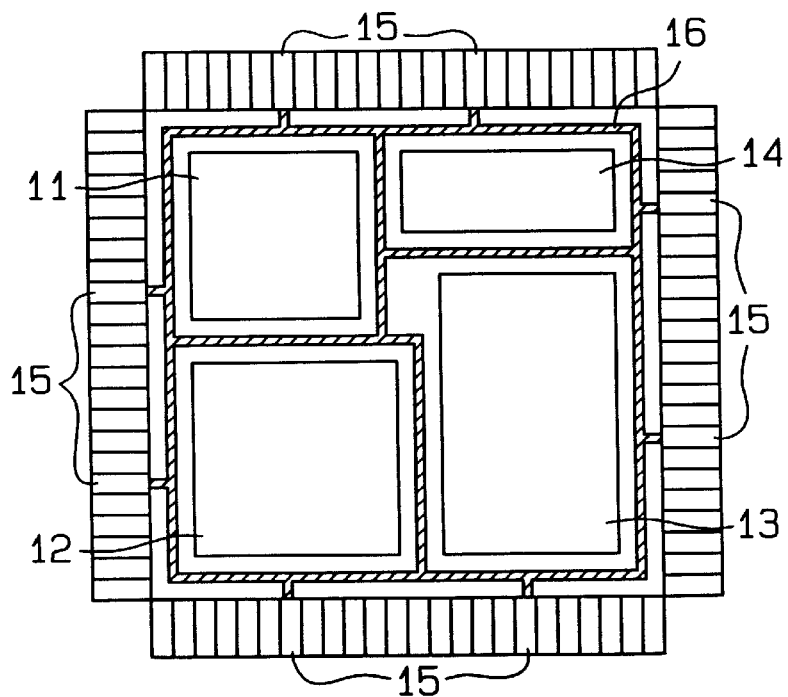
FIG. 9 is a layout diagram of semiconductor device of FIG. 8 in which a power wiring is arranged between the modules.

In step S1, the CPU 2 executes floor plan processing for a single chip semiconductor device 10 of FIG. 8. First, the CPU 2 lays out a plurality of (four in FIG. 8) modules 11 to 14 on the semiconductor device 10. Then, the CPU 2, as shown in FIG. 9, lays out power supply wiring (inter-module power wiring) 16 from external power supply terminals 15, around the periphery of the device 10, to each of the modules 11 to 14. The CPU 2 terminates the floor plan processing and moves to step S2. To simplify the description, the processing of only the module 11 is described in the subsequent steps S2 to S13, it being understood that similar processing is performed for the other modules 12–14.

In steps S2 to S6, the number of cell lines in the module is determined. The CPU 2 determines the number of cell lines in the module 11 based on the information of the module 11. The information of the module 11 includes the following three types of information:
1. Total size of all cells included in the module;
2. Size of each logical cell (cell width of each logical cell) included in the module; and
3. Number of unit cells included in the module.

At least one of these types of information is included in the logical data for the semiconductor device 10 prepared in the logical design stage. The CPU 2 determines the number of cell lines based on at least one of the three types of information.

In step S2, the CPU 2 determines whether the input information is total size of all cells included in the module. When the information is total size, the CPU 2 moves to step S6. As shown in FIG. 10A, the total size (total cell widths) A0 of all of the cells 17 is divided by the width W1 of the module 11, and obtained division result is the number of cell lines. The CPU 2, as shown in FIG. 10B, equally divides the longitudinal length of the module 11 according to the number of cell lines C1 to C3 and lays out each of the cell lines C1 to C3 in the module 11 according to the equally divided length.

In step S2, when the information is not total size, the CPU 2 moves to step S3 and determines whether the information is the cell width of each logical cell included in the module 11. When the information is the cell width of each logical cell, the CPU 2 moves to step S4 and as shown in FIG. 11A, calculates the total size (total cell widths) A0 of all of the cells 17 using the cell width A1 of each logical cells 18. In step S6, the CPU 2, as shown in FIG. 11B, lays out the cell lines C1 to C3 obtained using the module width W1 and the total size A0 in the module 11.

Figure 12A:
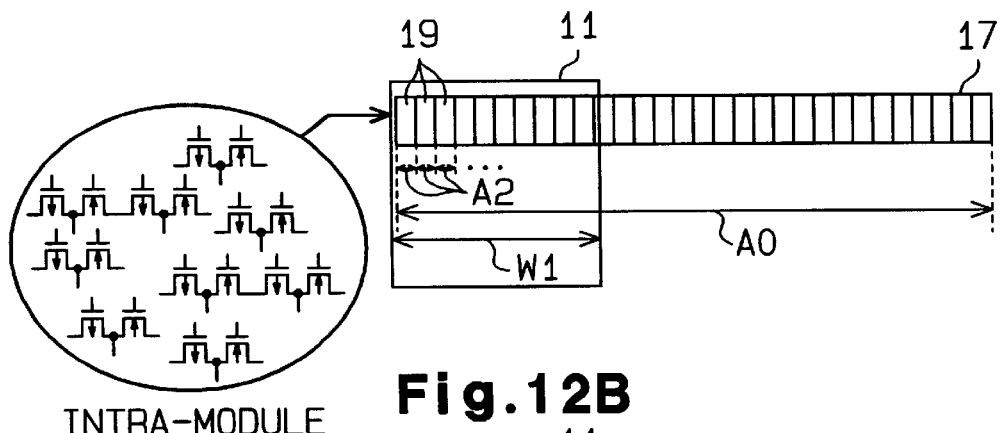
FIG. 12A is a diagram illustrating relationships between the total size of all of unit cells of the device of, FIG. 8 and the width of a module
Figure 12B:
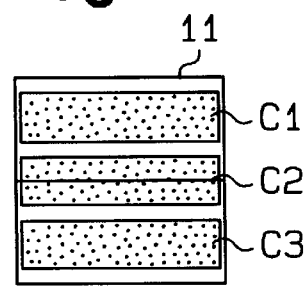
FIG. 12B is a layout diagram of the module in which the cell lines are arranged.

In step S3, when the information is not the cell width,it is determined that the information includes the number of unit cells included in the module 11. In this case, the CPU 2 moves to step S5 and as shown in FIG. 12A, calculates the total size (total cell widths) A0 of all of the cells 17 using the width A2 of a unit cell 19 and the number of unit cells. Then, in step S6, the CPU 2, as shown in FIG. 12B, lays out the cell lines C1 to C3 obtained using the module width WI and the total size A0.

Figure 13:
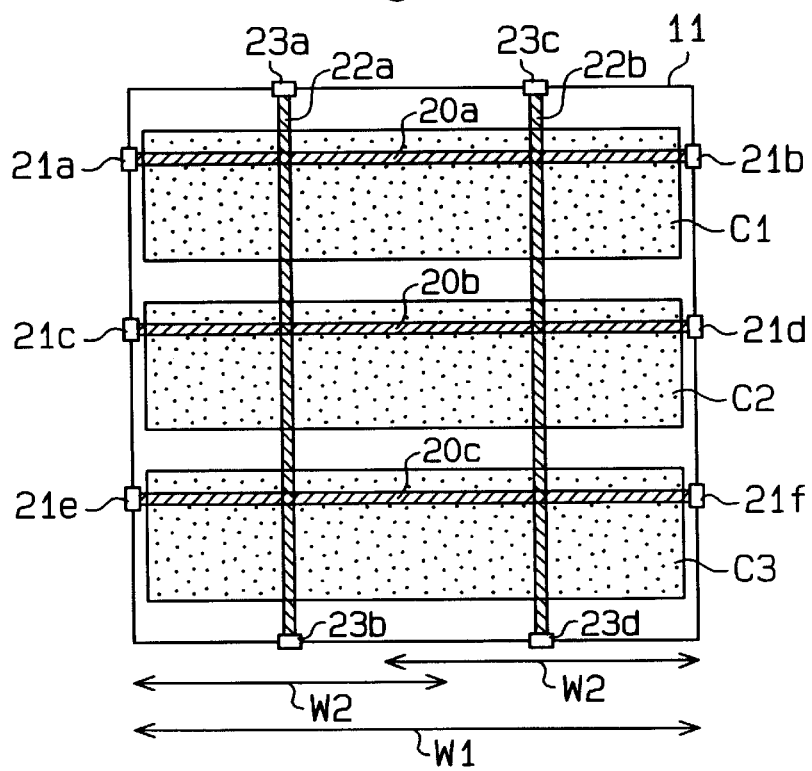
FIG. 13 is a layout diagram of a module of a semiconductor device in which power wirings and power supply terminals are arranged.

After having terminated the layout of the cell lines, the CPU 2 moves to step S7 and as shown in FIG. 13, lays out power wirings 20a to 20c extending in a first direction (lateral direction) for each of the cell lines C1 to C3. The CPU 2 further lays out power supply terminals 21a to 21f for each of the power wirings 20a to 20c at the intersections between each of the power wirings 20a to 20c and the frame of the module 11.

Then, in step S8, the CPU 2 lays out power wirings 22a and 22b extending in a second direction (longitudinal direction), which is perpendicular to the first direction for the cell lines C1 to C3. The number of power wirings 22a and 22b is determined based on the width W1 of the module 11 and each of the predetermined assignment width W2 for each of the power wirings 22a and 22b. The assignment width W2 is previously set according to the number of unit cells to which the power can be supplied by the power wirings 22a and 22b.

The CPU 2 determines the number of power wirings 22a 22b such that the total of the assignment width W2 exceeds the width W1 of the module 11 (that is, the assignment width W2×the number of power wirings>the module width W1). The CPU 2 then determines the positions of the power wirings 22a and 22b. In other words, the power wirings 22a and 22b are laid out at the position where they enter the inside from both the frames of the module 11 only to the extent of the predetermined distance (half the width W2). The CPU 2 lays out power supply terminals 23a to 23d for each of the power wirings 22a and 22b at the intersections of each of the power wirings 22a and 22b and the frame of the module 11.

The CPU 2 then moves to step S9 and changes the widths of the power wirings 22a and 22b according to the number of cell lines C1 to C3. When the number of cell lines increases, the longitudinal-direction power wirings are made thicker than the predetermined width.

Figure 14:
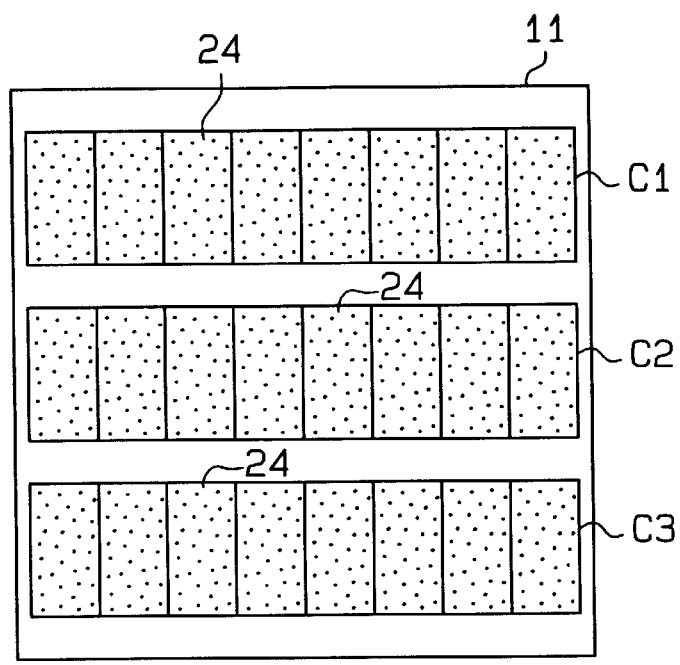
FIG. 14 is a layout diagram of a module in which logical cells are temporarily arranged.

In step S10, the CPU 2, as shown in FIG. 14, preferably divides each of the cell lines C1 to C3 according to average widths of the logical cells 18. In this step 10, logical cells 24 having the average widths are temporarily arranged.

Figure 15:
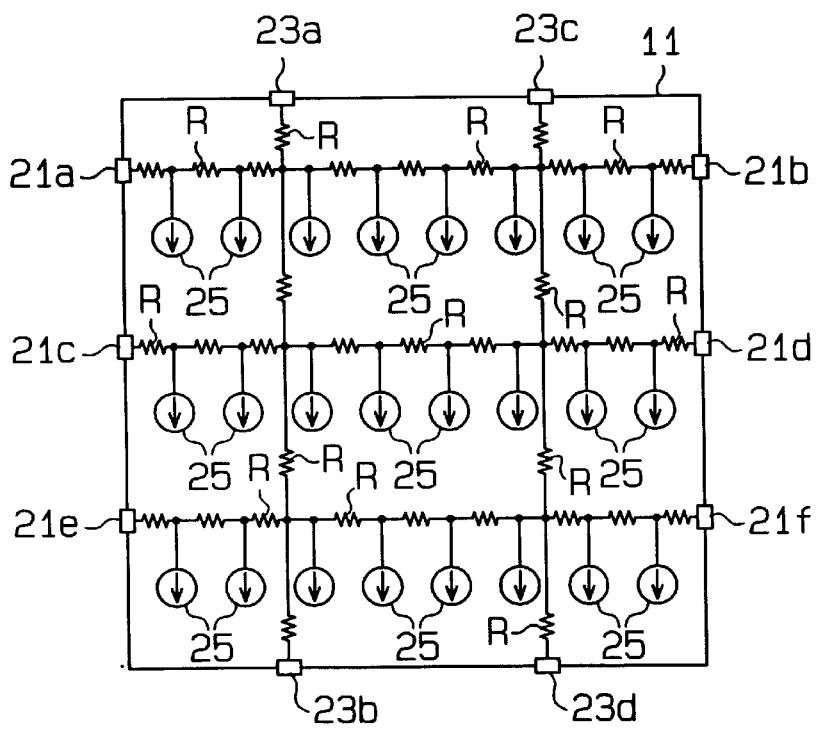
FIG. 15 is a diagram illustrating the current consumption that is distributed to power supply terminals laid out in a module.

In step S11, the CPU 2, as shown in FIG. 15, replaces each of the power wirings 20a to 20c, 22a, and 22b with a plurality of equivalent resistances R having resistance values based on a unit resistance value, wiring length, and wiring width. The CPU 2 further replaces the temporarily arranged cells 24 with current sources 25 having current values based on the current consumption of the cells 24. Subsequently, the power network comprising the plurality of equivalent resistance R and the current sources 25 is sampled.

Figure 16:
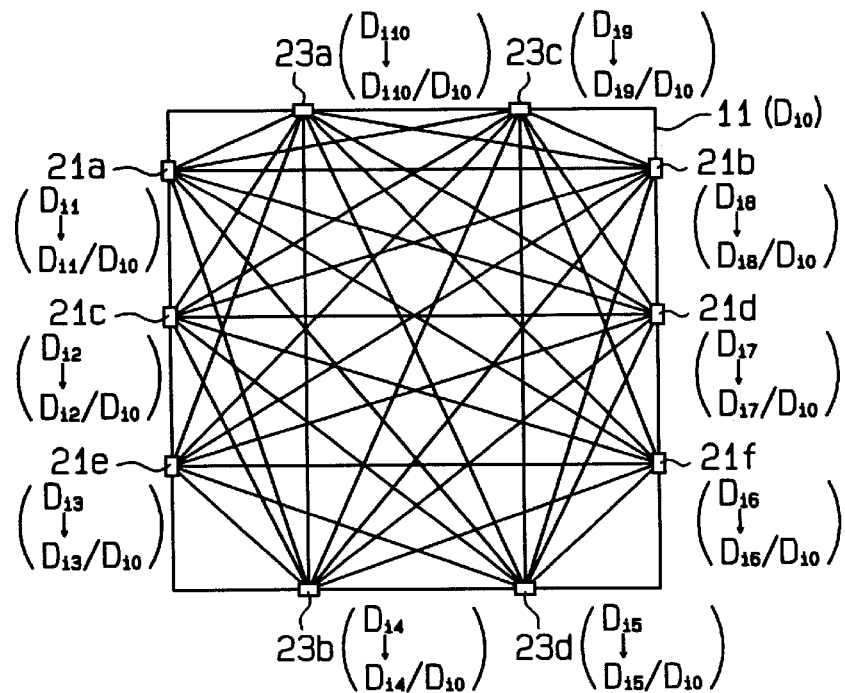
FIG. 16 is a diagram illustrating the layout data generation processing.

In step S12, the CPU 2 calculates the values of the current supplied to each of the power supply terminals 21a to 21f and 23a to 23d, as shown in FIG. 16, using the well known matrix operation for the sampled power supply network. In other words, the CPU 2 obtains the values of the loads supplied to each of the power supply terminals 21a to 21f and 23a to 23d. The CPU 2 then distributes the current consumption in the module 11 to each of the power supply terminals 21a to 21f and 23a to 23d. Accordingly, the current consumption in the module 11 is equivalently compressed as each of current value data items Di1 to Di10 in each of the power supply terminals 21a to 21f and 23a to 23d.

In step S13, the CPU 2 performs a ratio conversion by dividing each of the current value data items Di1 to Di10 according to the total current consumption Di0 in the module 11. The ratio-converted current value data items (Di1/Di0) to (Di10/Di0) are associated with the data regarding each of the power supply terminals 21a to 21f and 23a to 23d.

Figure 17:
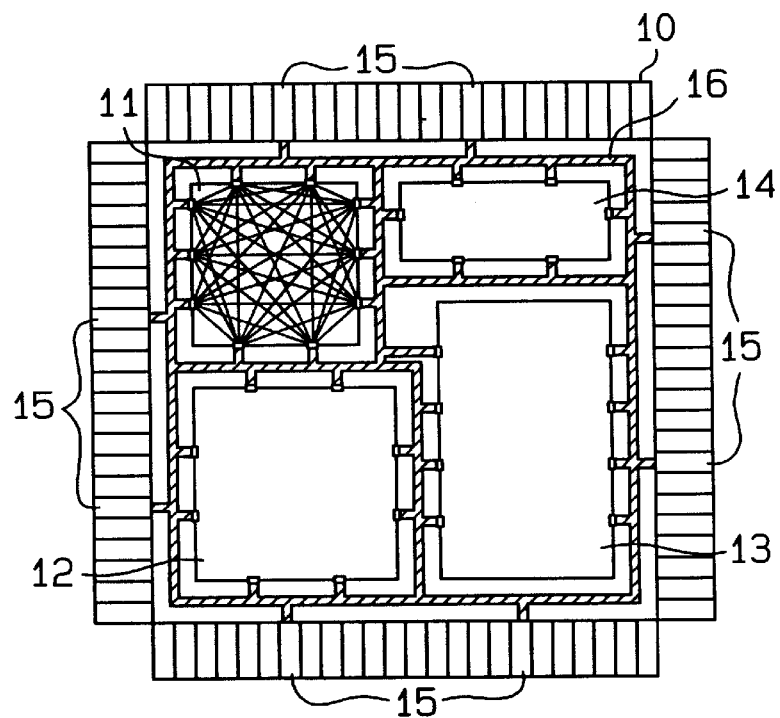
FIG. 17 is a layout diagram of a semiconductor device in which power supply terminals and inter-module power wirings laid out in a module are connected.

In step S14, the CPU 2, as shown in FIG. 17, connects the power supply terminals for each of the modules 11 to 14 and the inter-module power supply wirings 16. Further, the inter-module power supply wirings 16 are divided into a plurality of equivalent resistances R, and the power network of the entire semiconductor 10 is sampled.

In step S15, the CPU 2 analyzes the sampled power network. Through the analysis of this power network, the current density, voltage drop, and power supply terminal voltage value of the inter-module power wiring 16 are calculated, using a well known matrix operation, for the power network of the entire semiconductor device 10.

In step S16, the CPU 2 determines any excess and/or deficiency of the inter-module power wiring 16 based on the power network analysis result. Based on the excess and deficiency, it is determined whether the wiring width and position of the inter-module power wiring 16 should be changed or whether the entire semiconductor device 10 needs to be laid out again. When re-layout is necessary, the CPU 2 moves to step Si and re-executes the floor plan processing. Thus, the CPU 2 repeatedly executes the processing of steps S1 to S16 until the excess and deficiency of the power wiring 16 are eliminated.

When it is determined that re-layout is not necessary, the CPU 2 moves to step S17 and performs the cell layout in each of the modules 11 to 14 using the respective cell lines, power wirings, and power supply terminals. For example, the module 11 lays out the cells using each of the cell lines C1 to C3, each of the power wirings 20a to 20c, 22a, and 22b, and each of power supply terminals 21a to 21f and 23a to 23d.

At this time, the arrangement of the cells in each of the cell lines C1 to C3 is determined without moving the positions of the power supply terminals 21a to 21f and 23a to 23d of the module 11, positions of the power wirings 20a to 20c, 22a, and 22b, and positions of the cell lines 23a to 23d. In this case, the cell arrangement is restricted by the current consumption (load) distributed to each of the power supply terminals 21a to 21f and 23a to 23d. In other words, the cells are arranged so that changes of the current consumption ratio in each of the power supply terminals 21a to 21f and 23a to 23d are reduced. Accordingly, the load of the module 11 on each of the power supply terminals 21a to 21f and 23a to 23d is equalized and the inter-module power wiring 16 determined in steps S1 to S16 is validated.

As described above, the layout data generating apparatus 1 according to this embodiment temporarily arranges cells in each of the modules 11 to 14 and lays out the power wiring and power supply terminals in the module based on the position of each temporarily arranged cell. Subsequently, the current consumption of the load is compressed to each of the power supply terminals. Then, based on the power supply terminals of the module and the inter-module power wiring, the power network of the entire semiconductor device 10 is sampled and analyzed. Based on this analysis result, the floor plan processing is re-executed as required. This process is repeated until re-layout is no longer necessary. Thus, when the inter-module power wiring is laid out again, the cells in each of the modules are not laid out. As a result, the layout data generation time is reduced.

This embodiment has the following advantage in that the number of cell lines in the module 11 is simply obtained by dividing the total size A0 of all of the cells 17 in the module 11 according to the width W1 of the module.

Further, the lateral power wirings 20a to 20c for each of the cell lines C1 to C3 and the module power supply terminals 21a to 21f are easily laid out. The longitudinal power wirings 22a and 22b are easily laid out based on the assignment width W2. The wiring widths of the longitudinal power wirings 22a and 22b can easily be changed according to the number of cell lines C1 to C3.

In this embodiment, the current consumption ratio is converted by dividing the current value data items Di1 to Di10 equivalently compressed to each of the power supply terminals 21a to 21f and 23a to 23d according to the total current consumption Di0 in the module 11. Based on the ratio-converted current value data items (Di1/Di0) to (Di10/Di0), the current density, voltage drop, and voltage value are efficiently calculated.

The cells are laid out in each of the modules 11 to 14 using each of the cell lines C1 to C3, each of the power wirings 20a to 20c and 22a, and 22b, and each of power supply terminals 21a to 21f and 23a to 23d.

It should be apparent to those skilled in the art that the present invention may be embodied in many other specific forms without departing from the spirit or scope of the invention. Particularly, it should be understood that the invention may be embodied in the following forms.

One or any two of steps S2, S3, and S5 of FIG. 5 may be omitted.

In step S9, the widths of the longitudinal power wirings 22a and 22b may be changed according to the total current consumption in the module. The widths of the longitudinal power wirings may be increased by increasing the number of longitudinal power wirings.

In step S17, the cells in the module 11 may be laid out using only each of the power supply terminals 21a to 21f and 23a to 23d. Further, the cells in the module 11 may be laid out using each of the power supply terminals 21a to 21f and 23a to 23d and power wirings 20a to 20c, 22a, and 20b.

Therefore, the present examples and embodiments are to be considered as illustrative and not restrictive and the invention is not to be limited to the details given herein, but may be modified within the scope and equivalence of the appended claims.

What is claimed is:

1. A method to optimize power wiring layout in a layout data generating semiconductor integrated circuit comprising modules, each of the modules comprising cells, the method comprising:

laying out each of the modules;

laying out power supply wirings in each of the modules;

acquiring information about a size of each of the cells of each module;

temporarily arranging the cells in each module based on the information about the size of each of the cells;

laying out power wirings and power supply terminals for each module based on the temporary arrangement of the cells in each module;

sampling a power network in a unit of each module based on the cells in the module, the power wirings, and the power supply terminals;

analyzing the sampled power network for each module; and determining whether or not each module and the power supply wirings need to be laid out again based on the analysis of the sampled power network.

2. The method of claim 1, further comprising correcting the layout of the power supply wirings when re-layout is necessary.

3. The method of claim 1, further comprising permanently arranging the cells in each of the modules when re-layout is not necessary.

4. The method of claim 1, wherein the information about the size of each of the cells comprises information about the sizes of all of the cells used in the modules.

5. The method of claim 1, wherein the information about the size of each of the cells comprises information about a size of a logical cell used in the modules.

6. The method of claim 1, wherein the information about the size of each of the cells comprises information about a number of unit cells used in the modules.

7. The method of claim 1, further comprising determining an average width of each of the cells of each module, wherein the cells temporary arranged in each module comprise the average width.

8. A method to optimize power wiring layout in a layout data generating semiconductor integrated circuit comprising modules, each of the module comprising cells, the method comprising:

laying out each of the modules;
laying out power supply wirings in each of the laid out modules; acquiring information about a size of each of the cells of each of the modules;
defining cell line regions in each module based on the size of each of the cells;
temporarily arranging the cells in each cell line region;
laying out power wirings for each module, comprising first power wirings in parallel with each cell line in the module and laying out power supply terminals connected to the power wirings;
sampling a power network in a unit of each module based on the cells in the module, the power wirings, and the power supply terminals;
analyzing the sampled power network for each module; and
determining whether or not each module and each power supply wiring need to be laid out again based on the analysis of the sampled power network.

9. The method of claim 8, wherein the laying out the power wirings comprises:

laying out second power wirings along an orthogonal direction with each cell line; and
laying out power supply terminals connected to the second power wirings.

10. The method of claim 9, wherein a width of the second power wirings is determined by a number of cell lines arranged in the module.

11. The method of claim 9, wherein a width of the second power wirings is determined in accordance with a current consumption of the module.

12. The method of claim 8, wherein the analyzing the power supply network comprises:

calculating a current consumption supplied to each power supply terminal;
distributing an intra-module current consumption to each power supply terminal; and
dividing the current consumption supplied to each power supply terminal by the intra-module total current consumption to generate a current value data.

13. The method of claim 8, further comprising:

correcting the layout of the power supply wirings when re-layout is necessary; and
permanently arranging the cells in the modules when re-layout is not necessary.

14. The method of claim 13, wherein the permanently arranging the cells in the modules comprises arranging the cells in the modules using the power supply terminals.

15. The method of claim 13, wherein the permanently arranging the cells in the modules comprises arranging the cells in the modules using the power wirings and the power supply terminals.

16. The method of claim 13, wherein the permanently arranging the cells in the modules comprises arranging the cells in the modules using the temporarily arranged cells, the power wirings, and the power supply terminals.

17. An apparatus to optimize power wiring layout in a layout data generating semiconductor integrated circuit comprising modules, each of the modules comprising cells, the apparatus comprising:

a memory storing information about a size of each of the cells of each module; and
a processor connected to the memory, executing layout processing, wherein the processor
lays out each module,
lays out power supply wirings in the modules,
temporarily arranges the cells in each module based on the size of each of the cells,
lays out power wirings and power supply terminals in the module based on the temporary arrangement of the cell,
samples a power network in a unit of each module based on the cells in the module, the power wirings, and the power supply terminals,
analyzes the sampled power network for each module, and
determines whether or not each module and the power supply wiring need to be laid out again based on the analysis of the sampled power network.

18. The apparatus of claim 17, wherein the processor corrects the layout of the power supply wirings when re-layout is necessary.

19. The apparatus of claim 17, wherein the processor permanently arranges the cells in each of the modules when re-layout is not necessary.

20. The apparatus of claim 17, wherein the information about the size of each of the cells comprises information about the sizes of all of the cells used in the modules.

21. The apparatus of claim 17, wherein the information about the size of each of the cells comprises information about a size of a logical cell used in the modules.

22. The apparatus of claim 17, wherein the information about the size of each of the cells comprises information about a number of unit cells used in the modules.

23. The apparatus of claim 17, wherein the processor further determines an average width of each of the cells of each module, wherein the cells temporary arranged in each module comprise the average width.

24. An apparatus to optimize power wiring layout in a layout data generating semiconductor integrated circuit comprising modules, each module comprising cells, the apparatus comprising:

a memory storing information about a size of each of the cells of each module; and
a processor connected to the memory, executing layout processing, wherein the processor
lays out each module,
lays out power supply wirings in the modules,
defines cell line regions in each module based in the size of each of the cells,
temporarily arranges the cells in each cell line region,
lays out power wirings for each module comprising first power wirings in parallel with each cell line in the module and laying out power supply terminals connected to the power wirings, samples a power network in a unit of each module based on the cells in the module, the power wirings, and the power supply terminals, analyzes the sampled power network for each module, and determines whether or not each module and each power supply wiring need to be laid out again based on the analysis of the sampled power network.

25. The apparatus of claim 24, wherein the processor lays out second power wirings along an orthogonal direction with each cell line and lays out power supply terminals connected to the second power wirings.

26. The apparatus of claim 25, wherein a width of the second power wirings is determined by a number of cell lines arranged in the module.

27. The apparatus of claim 25, wherein a width of the second power wirings is determined in accordance with a current consumption of the module.

28. The apparatus of claim 24, wherein the processor further calculates a current consumption supplied to each power supply terminal; distributes an intra-module current consumption to each power supply terminal; and divides the current consumption supplied to each power supply terminal by the intra-module total current consumption to generate a current value data.

29. The apparatus of claim 24, wherein the processor corrects the layout of the power supply wirings when re-layout is necessary and permanently arranges the cells in the modules when re-layout is not necessary.

30. The apparatus of claim 29, wherein the processor permanently arranges the cells in the modules using the power supply terminals.

31. The apparatus of claim 29, wherein the processor permanently arranges the cells in the modules using the power wirings and the power supply terminals.

32. The apparatus of claim 29, wherein the processor permanently arranges the cells in the modules using the temporarily arranged cells, the power wirings, and the power supply terminals.

33. A recording medium comprising recorded thereon computer readable program code to optimize power wiring layout in a layout data generating semiconductor integrated circuit, the circuit comprising modules comprising cells, the program comprising:

laying out each module;

laying out power supply wirings in the modules;

acquiring information about a size of each of the cells of each module;

temporarily arranging the cells in each module based on the size of each of the cells; laying out power wirings and power supply terminals in the modules based on the temporary arrangement of the cells;

sampling a power network in a unit of each module based on the cells in the module, the power wirings, and the power supply terminals;

analyzing the sampled power network for each module; and determining whether or not each module and the power supply wirings need to be laid out again based on the analysis of the sampled power network.

34. The recording medium of claim 33, wherein the program further comprises correcting the layout of the power supply wirings when re-layout is necessary.

35. The recording medium of claim 33, the program further comprises permanently arranging the cells in each of the modules when re-layout is not necessary.

36. The recording medium of claim 33, wherein the information about the size of each of the cells comprises information about the sizes of all of the cells used in the modules.

37. The recording medium of claim 33, wherein the information about the size of each of the cells comprises information about a size of a logical cell used in the modules.

38. The recording medium of claim 33, wherein the information about the size of each of the cells comprises information about a number of unit cells used in the modules.

39. The recording medium of claim 33, further comprising determining an average width of each of the cells of each module, wherein the cells temporary arranged in each module comprise the average width.

40. A recording medium comprising recorded thereon computer readable program code to optimize power wiring layout in a layout data generating semiconductor integrated circuit, the circuit comprising modules comprising cells, the program comprising:

laying out each of the modules;

laying out power supply wirings in each of the modules;

acquiring information about a size of each of the cells of each module;

defining cell line regions in each module based on the size of each of the cells;

temporarily arranging the cells in each cell line region;

laying out power wirings for each module comprising first power wirings in parallel with each cell line in the module and laying out power supply terminals connected to the power wirings;

sampling a power network in a unit of each module based on the cells in the module, the power wirings, and the power supply terminals;

analyzing the sampled power network for each module; and determining whether or not each module and each power supply wiring need to be laid out again based on the analysis of the sampled power network.

41. The recording medium of claim 40, wherein the laying out the power wirings comprises:

laying out second power wirings along an orthogonal direction with each cell line; and laying out power supply terminals connected to the second power wirings.

42. The recording medium of claim 41, wherein a width of the second power wirings is determined by a number of cell lines arranged in the module.

43. The recording medium of claim 41, wherein a width of the second power wirings is determined in accordance with a current consumption of the module.

44. The recording medium of claim 40, wherein the analyzing the power supply network comprises calculating a current consumption supplied to each power supply terminal;

distributing an intra-module current consumption to each power supply terminal; and dividing the current consumption supplied to each power supply terminal by the intra-module total current consumption to generate a current value data.

45. The recording medium of claim 40, the program further comprises:

correcting the layout of the power supply wirings when re-layout is necessary; and permanently arranging the cells in the modules when re-layout is not necessary.

46. The recording medium of claim 45, wherein the permanently arranging the cells in the modules comprises arranging the cells in the modules using the power supply terminals.

47. The recording medium of claim 45, wherein the permanently arranging cells in the modules comprises arranging the cells in the modules using the power wirings and the power supply terminals.

48. The recording medium of claim 45, wherein the permanently arranging the cells in the modules comprises arranging the cells in the modules using the temporarily arranged cells, the power wirings, and the power supply terminals.

* * * * *